(12) United States Patent
Torre et al.

(10) Patent No.: US 6,483,454 B1
(45) Date of Patent: Nov. 19, 2002

(54) CLOSE FORMATION AIRCRAFT COLLISION AVOIDANCE

(75) Inventors: Frank M. Torre, Huntington; Randolph A. Purdy, Sayville, both of NY (US)

(73) Assignee: Bae Systems Aerospace Inc., Greenlawn, NY (US)

( * ) Notice: Subject to any disclaimer, the term of this patent is extended or adjusted under 35 U.S.C. 154(b) by 0 days.

(21) Appl. No.: 09/724,354

(22) Filed: Nov. 28, 2000

(51) Int. Cl.[7] ................................................ G01S 13/00
(52) U.S. Cl. ........................................... 342/30; 342/29
(58) Field of Search ...................... 342/29–32

(56) References Cited

U.S. PATENT DOCUMENTS

| | | | | |
|---|---|---|---|---|
| 3,447,154 A | * | 5/1969 | Schrader | 343/6.5 |
| 3,801,979 A | * | 4/1974 | Chisholm | 343/6.5 |
| RE29,260 E | * | 6/1977 | Litchford | 343/16 |
| 4,139,848 A | * | 2/1979 | Maxwell, Jr. | 343/6 |
| 4,710,774 A | * | 12/1987 | Gunny | 342/455 |
| 5,043,903 A | * | 8/1991 | Constant | 364/460 |
| 5,194,869 A | * | 3/1993 | Kochiyama et al. | 342/125 |
| 5,493,309 A | * | 2/1996 | Bjornholt | 342/455 |
| 6,313,783 B1 | * | 11/2001 | Kuntman et al. | 342/32 |

* cited by examiner

Primary Examiner—Thomas H. Tarcza
Assistant Examiner—Brian Andrea
(74) Attorney, Agent, or Firm—Edward A. Onders; Kenneth P. Robinson

(57) ABSTRACT

Collision avoidance systems are provided for groups of aircraft operating in close proximity, as during formation flights or cooperative missions. Fixed and rotary airfoil aircraft with separations of 30 feet to 5 miles, for example, participate in a local radio sub-net. An aircraft receiving CAS sub-net signals derives signal transit time values representing differences between send and receive times and which are used to derive data on inter-aircraft range and closing rate. With synchronized clocks, highly-accurate one-way ranging uses assigned time slots with predetermined sub-net time-of-day timing of transmissions. Round-trip ranging operates with less accurate time synchronization, and systems may operatively select between one-way and round-trip ranging. By exchange of range and closing rate data among aircraft, 3-D data for current three-dimensional location of aircraft enables evasive action determination. Data is thus made available for provision of audio and visual flight crew communications indicating alerts and warnings of impending collision danger and appropriate evasive action.

29 Claims, 4 Drawing Sheets

CLOSE FORMATION AIRCRAFT COLLISION AVOIDANCE

RELATED INVENTIONS (Not Applicable)

FEDERALLY SPONSORED RESEARCH (Not Applicable)

BACKGROUND OF THE INVENTION

The invention relates to aircraft collision avoidance systems and, more particularly, to such systems able to provide collision avoidance and evasive action alerts to pilots of fixed wing and other aircraft operating in close proximity, independently of reliance on Global Positioning System (GPS) inputs.

A typical prior type of aircraft collision avoidance system (CAS) may be designed for use by aircraft flying on independent flight paths, such that the aircraft are normally relatively widely separated. A collision risk may arise because, while basically proceeding on disparate flight paths, at some point in time the two aircraft may begin to approach each other unexpectedly. Thus, the intention may be that one aircraft should not come into close proximity to another and a CAS may be designed to give warning to avoid having a close proximity situation arise. For this purpose, a close proximity situation may be considered to arise when two aircraft are within one mile range and one thousand feet vertical separation of each other, or closer.

A wide variety of CAS approaches have previously been proposed, many to address the situation just described. Typically, the two aircraft which become exposed to a close proximity situation have no prior relationship to each other and each was unaware of the intended flight path of the other aircraft. The problem may commonly arise because of an unintended flight path, as where one aircraft unknowingly deviates toward or into an unauthorized altitude or flight path. A common aspect of collision avoidance in such circumstances is that the relevant aircraft are not intended to come within close proximity of each other and the objective is to maintain relatively large aircraft separations in range and altitude. To meet such collision avoidance objectives, prior systems may employ radar, communication, or GPS techniques, or combinations thereof, which are particularly suited to monitoring and detection of the potential for close proximity situations.

A qualitatively different situation exists when aircraft are intentionally placed in a close proximity situation. For example, a group of aircraft may be positioned in a relatively close formation in the course of a flight for military or other purposes. Fixed wing, helicopters and other aircraft of the same or mixed types may also be called upon to operate in relatively close proximity in the course of efforts on common or related projects or missions. In such situations, intended aircraft separations may be as small as one hundred feet vertically and laterally, or less. Prior CAS systems have generally been unsuitable for providing reliable collision avoidance performance under conditions of such small intended separations between aircraft. The basic system parameters may be inapplicable to close aircraft operations and some prior systems may also be limited as to suitable performance where both fixed and rotary wing aircraft are involved. System reliance on GPS data may also limit close formation capabilities of prior system approaches. Thus, with reliance on GPS data, overall system accuracy or potential interruptions in data availability may be unacceptable in the context of close tolerances and quick continuous response characteristics required in close formation operation.

Objects of the present invention are, therefore, to provide new and improved collision avoidance systems, and such systems having one or more of the following characteristics and capabilities;

continuous monitoring of separations and rate of closure between aircraft in close formation or proximity;

direct measurement of range and closing rate based on signal transit time between aircraft;

operable for fixed-wing aircraft at high speed formation flight or dynamic maneuvering;

operable for helicopters operating at separations of two to three rotor diameters;

operable independently of, or supplemented by, GPS data;

mutual ranging and positioning based on signals transmitted by each aircraft;

low power, short range operation;

low probability of detection and interception;

local radio sub-net, with participation by small number of aircraft in a common neighborhood;

continuous position monitoring with critical situation alarms or recommended evasive action alerts, or both; and fast response and fast updates for close cluster aircraft operations.

SUMMARY OF THE INVENTION

In accordance with the invention, there is provided a collision avoidance system (CAS), suitable for airborne use on a first aircraft to enable collision avoidance during close proximity operation of a group of CAS equipped aircraft. The system includes a timing device to provide time data, a transmitter to transmit CAS signals at defined send times and in format usable to derive signal transit time values, and a receiver to receive the CAS signals from other aircraft of the group. Also included is a processor coupled to the timing device, transmitter and receiver and responsive to received CAS signals to:

(i) derive received signal parameter values, including signal transit time values representative of differences between send times and receive times of CAS signals received from other aircraft of the group; and (ii) utilize the signal parameter values to repetitively derive data on range and closing rate between the first aircraft and at least one other aircraft of the group.

Pursuant to the invention, the processor may further be arranged to:

(iii) utilize the data on range and closing rate to derive signals representative of a condition of danger of impending collision between aircraft;

(iv) utilize the data on range and closing rate to repetitively derive 3-D data representative of the three-dimensional relative location of all aircraft of the group;

(v) derive signals representative of evasive action to be taken to remove the first aircraft from a condition of impending collision between aircraft; and (vi) establish and maintain a local radio sub-net with other aircraft of the group.

Also in accordance with the invention, a method, to operate a collision avoidance system (CAS) within a group of aircraft, includes the steps of:

(a) establishing a local radio sub-net between aircraft of a group of aircraft within a limited volume of airspace;

(b) transmitting aircraft-to-aircraft CAS signals of format usable to derive time reference values;

(c) receiving CAS signals and deriving data on inter-aircraft range and closing rate based on received signal parameter values, including signal transit time between aircraft; and (d) utilizing data derived in step (c) to derive signals usable to indicate a condition of danger of impending collision between aircraft.

In methods pursuant to the invention, step (c) may include deriving data representative of the three-dimensional location of all aircraft of the group, and step (d) may additionally include deriving signals usable to indicate evasive action to be taken to alleviate a danger of impending collision between aircraft.

For a better understanding of the invention, together with other and further objects, reference is made to the accompanying drawings and the scope of the invention will be pointed out in the accompanying claims.

DESCRIPTION OF THE INVENTION

Figure 1:
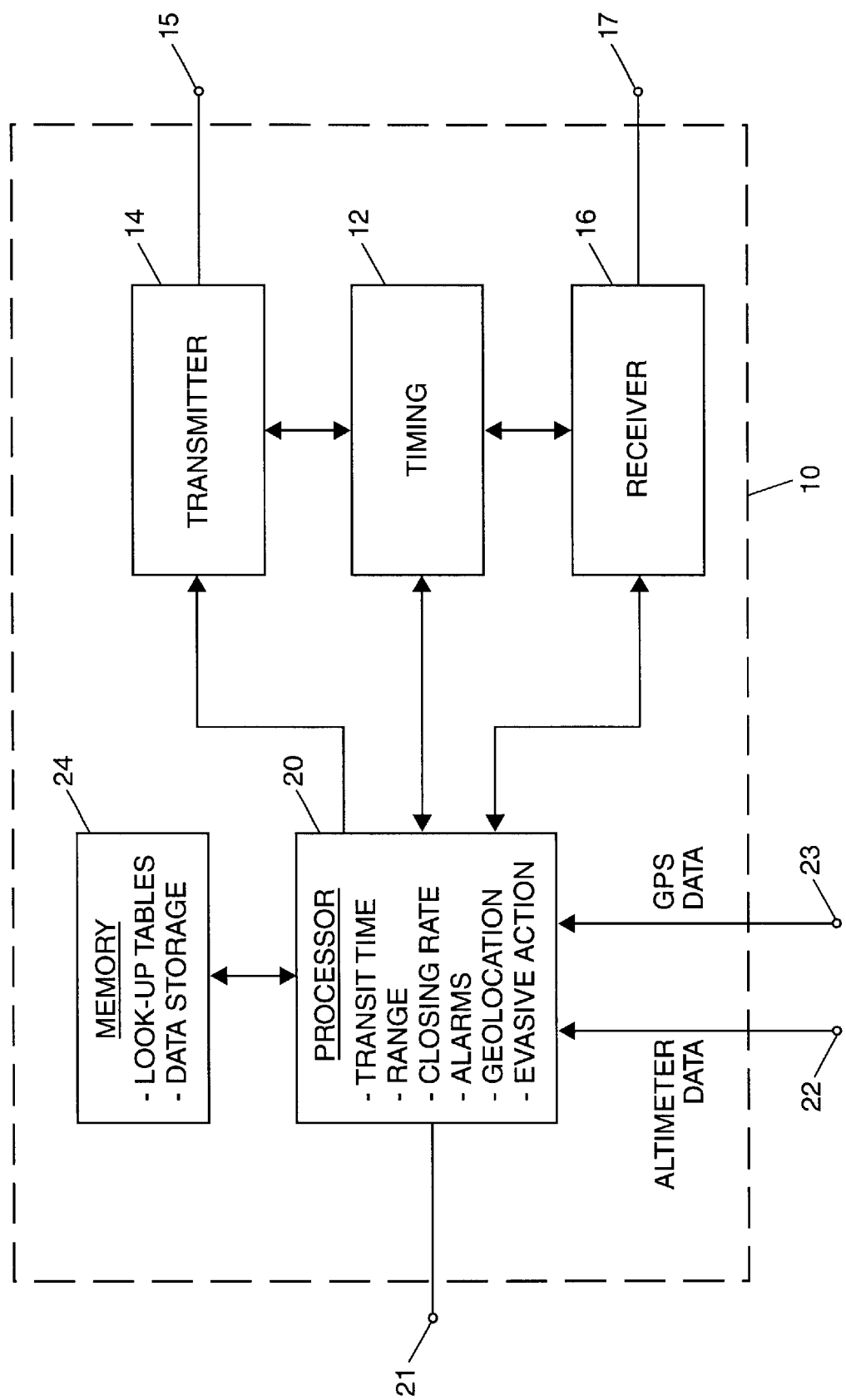
FIG. 1 is a block diagram of a collision avoidance system in accordance with the invention.

FIG. 1 illustrates an embodiment of a collision avoidance system 10 in accordance with the invention. The system 10 is a collision avoidance system (sometimes referred to as a "CAS" herein) suitable for use on a first aircraft to enable collision avoidance within a group of aircraft during close proximity operation. Such operation commonly occurs when a group of fixed wing, (e.g., fighter aircraft) or rotary airfoil(e.g., helicopter) aircraft, or both, fly in formation or on a cooperative mission for short or extended periods, for example. In such circumstances the aircraft may intentionally operate and maneuver at separations of the order of twenty-five feet or two rotor diameters. As previously discussed, many prior types of CAS operate on an "early warning" basis to alert a pilot when another aircraft (typically an unknown aircraft) comes within a range representing a danger of potential collision. By comparison, the present system typically operates under circumstances in which it is intended that aircraft operate at separations which present a danger of potential collision which continues over a period of time.

Figure 2:
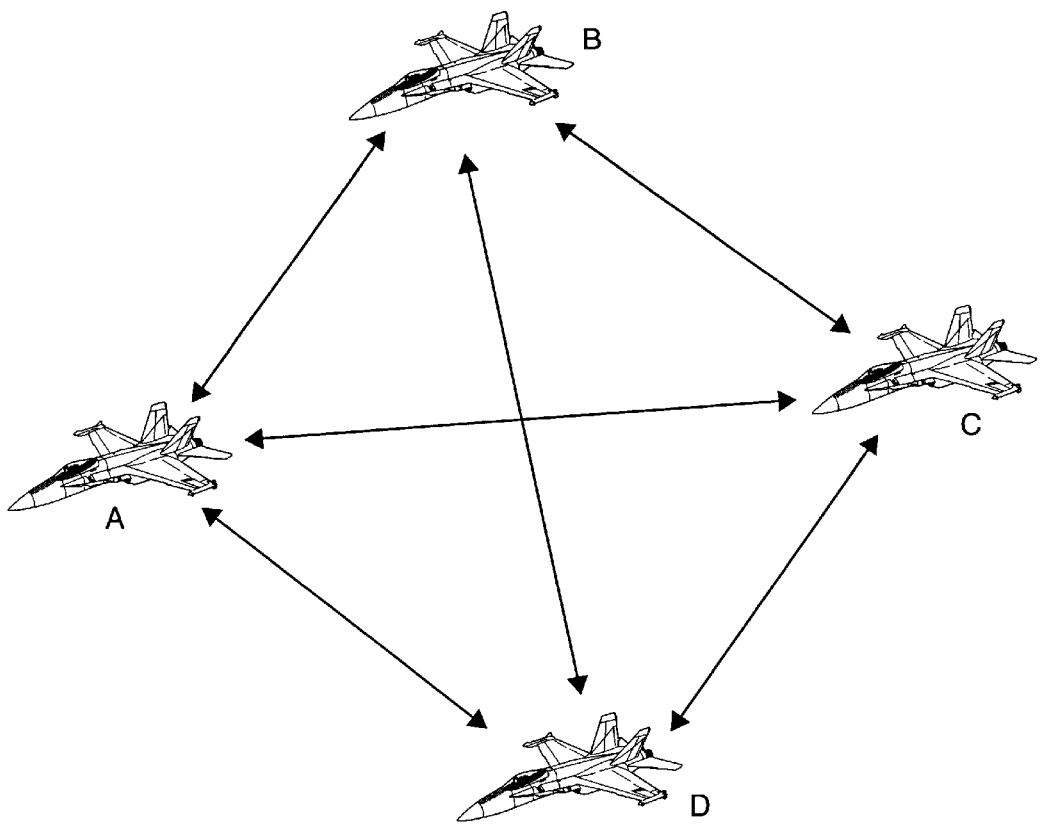
FIG. 2, showing aircraft in formation, is useful in describing a local radio sub-net and inter-aircraft transmission and reception of CAS signals.

FIG. 2 shows a group of four aircraft A, B, C, D flying in formation. To employ the invention in this example, each aircraft carries a system of the type illustrated in FIG. 1. As will be described, the FIG. 1 system utilizes inter-aircraft communication signals pursuant to a local radio sub-net established and maintained between appropriately equipped aircraft while they remain within a limited volume of airspace (e.g., aircraft separations not exceeding 50 miles, or less). By synchronization of timing devices on the various aircraft, time-of-day time data can be utilized as a reference to enable determination of transit time of CAS signals sent between aircraft. The system thus provides close proximity separation accuracies not achievable by reliance on GPS or radar data, although GPS or radar data may be used on a supplementary basis to augment derivation of 3-D data representative of the three-dimensional relative location of all aircraft of a group of aircraft, for example.

FIG. 2 illustrates a local radio sub-net, with the double-headed arrows representative of inter-aircraft communication signals transmitted and received between all aircraft A, B, C, D of the group. Typically, two-way (half duplex) communications may be employed for exchange of CAS signals. Once aircraft come within the limited local range of the system, enabling low-power sub-net participation, the system is enabled to operate on a continuous basis to continually derive and exchange range and closing rate data regarding each aircraft relative to the other participating aircraft. Three-dimensional geolocation data derived for aircraft in formation or other close proximity can then be employed in the monitoring for the presence of danger conditions and provision of warning and evasive action signals.

More specifically, the FIG. 1 system 10 includes a timing device 12 to provide time and frequency reference signals and arranged for time-of-day synchronization between similar devices on each aircraft currently participating in a local radio sub-net for CAS purposes. The system, as illustrated, also includes transmitter and receiver units which may be discrete units or portions of integrated electronics. Transmitter 14 is arranged to transmit CAS signals at identified send times (e.g., under control of processor 20 based on common time-of-day reference) and in predetermined format usable to derive signal transit time values. Receiver 16 is arranged to receive CAS signals from other aircraft of the group. Thus, with the FIG. 1 system employed on aircraft A of FIG. 2, receiver 16 can receive CAS signals from each of aircraft B, C, D of the illustrated formation, as well as other participatory aircraft present within the range of the local radio sub-net. The transmitter, via coupling point 15, and the receiver, via coupling point 17, are coupled to antenna assembly elements to enable signal transmission and reception. The antenna assembly (not shown) may include a common or individual antennas suitably configured for the particular aircraft environment, and diplexer or other elements for coupling of transmitted and received signals from and to points 15 and 17. As shown, units 14 and 16 are coupled to timing unit 12 to enable utilization of time references and time-of-day inter-aircraft synchronization. Particular aspects of these units may be described further below, however in general available technology, as may be employed by skilled persons once having an understanding of the invention, is utilized.

The CAS 10 as illustrated in FIG. 1 further includes a processor 20 which is responsive to received CAS signals to: (i) derive received signal parameter values, including signal transit time values representative of differences between send times and receive times of CAS signals received from other aircraft of the group (e.g., received by aircraft A from aircraft B, C, D); and (ii) utilize the signal parameter values to repetitively derive data on range and closing rate between one aircraft and one or all of the other aircraft. Processor 20 may be arranged to additionally do one or more of the following: (a) control send times of CAS signals transmitted by transmitter 14; (b) derive signals representative of a condition of danger of impending collision; (c) repetitively derive 3-D data representative of the three-dimensional relative location of all aircraft of the group; (d) derive signals representative of evasive action to be taken to remove an aircraft from a danger of impending collision; (e) establish and maintain a local radio sub-net with other aircraft; and (f) synchronize timing device operation to establish common time-of-day time data for use by aircraft of the group. As represented in FIG. 1, processor 20 is coupled to timing device 12, transmitter 14 and receiver 16 for control, timing and signal coupling purposes. Also as shown, one of both of signal input ports 22 and 23 may be provided to enable input to processor 20 of airborne altimeter and GPS data, respectively, as made available from onboard altimeter and GPS receiver devices. While not required for basic system operation, altimeter, GPS and other available data can be used on a supplemental basis, particularly with respect to development of 3-D data on geolocation of all aircraft of a group. An output port 21 is provided to enable signals (such as signals representative of alarms or danger of impending collision or evasive action suitable to avoid impending collision) to be provided to aircraft displays or processors or other devices arranged to alert the flight crew, implement an evasive response or otherwise utilize such signals.

As shown, processor 20 is also coupled to memory unit 24, which may be of any appropriate configuration suitable for enabling storage and retrieval of data for present purposes. Memory 24 is utilized for storage of one or more look-up tables usable for referencing of derived range and closing rate data to predetermined stored data values representative of collision danger conditions. Thus, threshold pairs of range and closing rate values may be predetermined as applicable to the specific aircraft and stored. Then, when compared to the stored threshold pairs, currently derived data may match at one of several alert levels, such as "watch", "warning" or "immediate evasive action". A resulting signal representative of the specific alert level for the match can then be visually or aurally communicated to the pilot via suitable existing types of interface and communication devices.

Consistent with the foregoing, processor 20 may employ known computer-based technology to use CAS signals received from other aircraft (e.g., CAS signals received by aircraft A from aircraft B) to derive signal transit time values representative of differences between send times (from aircraft B) and receive times (at aircraft A). By being representative of the signal transit time between aircraft, the signals are thereby representative of aircraft separation or the range between the aircraft. Changes in such range, as represented by changes in successive signal transit time values, are indicative of the closing rate between the aircraft (e.g., on a moment-to-moment basis, the aircraft may be closing or separating at a specific rate or the separation may currently remain constant). Alternatively, closing rate may be determined on the basis of analysis of other received signal parameters, such as received signal carrier frequency or phase variations. It will be appreciated that both the inter-aircraft range and closing rate are relevant to whether there is presently an impending danger of mid-air collision. Consistent with this, stored look-up tables or other techniques may be employed for situation evaluation. By referencing current range and closing rate values to predetermined stored situational values a specific response or alert can be provided. If two aircraft are within a predetermined range and are approaching each other, look-up table data may indicate a present danger of impending collision and that under these conditions the pilot should be immediately alerted. Conversely, if the separation is adequate and there is no adverse closing rate, the look-up table data may indicate that no alert or warning is currently needed, even though the aircraft are flying at high speed in close formation. In some instances a standby indication of marginal adequacy of the present operating situation may be appropriate. Appropriate indications based on look-up table data may depend on whether the aircraft are intended to fly in close formation for an extended period, for example, or are intended to come into close proximity for only a short period, and different look-up table data may be employed in each case.

In addition to basic inter-aircraft signal transit time data derived via received CAS signals, processor 20 may be supplied with altimeter or GPS data, or both. Altimeter and GPS data for the host aircraft A may be provided from on-board units via ports 22 and 23 of FIG. 1. Such data for other aircraft of a group participating in a local radio net can be incorporated into CAS signals sent between aircraft. With the benefit of sufficient altimeter and or GPS data, processor 20 can derive 3-D data representative of the three-dimensional relative location of all aircraft of the group and repetitively update such d-D data. Under conditions of impending collision, the availability of the 3-D data can enable processor 20, in addition to providing danger alert signals, to also provide signals indicative of evasive action which is appropriate under the current conditions. Evasive action specifically suited to particular circumstances can be predetermined, with look-up table data provided for referencing to formulate flight crew communications as appropriate. In some applications, automated evasive action via a flight control system may be implemented.

In providing signals representative of a danger of impending collision or of evasive action to be taken, it will be appreciated that the system 10 of FIG. 1 is not configured to itself present alerts or messages to the flight crew. System 10 is arranged to provide signals representative of various conditions, evasive actions, etc., at port 21. Heads-up displays, visual warning indicators, loud speakers and other appropriate signal or message delivery devices may be arranged by skilled persons using known technology to appropriately react to signals provided by processor 20 to deliver communications to the flight crew or evasive action instructions to a flight control system.

A key aspect of the present invention is the derivation of signal transit time values representative of differences between send times and receive times of CAS signals received by one aircraft from other aircraft participating in a local radio net. From such time values a variety of data can be derived by processor 20 as the basis for providing output signals representative of danger warnings, appropriate evasive action, and other matters. Inherent in the derivation of data and signals is reliance on the accuracy of the transit time values derived. Such values may be derived in at least two basic ways. First, as one-way signal transit time based on CAS signals received by a first aircraft following transmission by a second aircraft. Alternatively, as round-trip signal transit time based on CAS signals sent from the first aircraft to the second aircraft and responsively sent back to the first aircraft from the second aircraft. In the round-trip case, it will be understood that the CAS signals sent by the second aircraft to the first aircraft are not the same signals as received, but are signals sent under known receive and send time constraints as responsive CAS signals for use by the first aircraft. As will be further described, with inter-aircraft timing device synchronization to provide a common time-of-day time reference of adequate accuracy, one-way signal transit time can be employed and provide greater accuracy than reliance on round-trip signal transit time. Thus, each aircraft may have assigned discrete time slots for transmission, enabling the receiving aircraft to know the time-of-day of a transmitted signal and directly derive signal transit time between transmission and reception. Alternatively, on a round-trip basis the first aircraft sends a signal, receives a responsive signal, and derives transit time between aircraft as one-half of the round-trip time after deletion of a predetermined time period between signal reception and responsive transmission by the second aircraft.

It will be appreciated that transit time between aircraft is desirably derived many times per second on a continuing basis, so that effective averaging of derived inter-aircraft range over many derivations tends to enhance accuracy. Nevertheless, it has been determined that errors or transit time measurement accuracy constraints typically have a greater effect on round-trip range accuracy, as compared to one-way range determinations in the presence of accurate common time-of-day reference tracking. Pursuant to the invention, a presently preferred embodiment employs transit time values based on one-way signal transit time determinations when time-of-day reference is accurately maintained between aircraft, and transit time values based on round-trip transit time determinations in other circumstances. The processor 20 may thus be configured to operate on a one-way signal basis, unless it is necessary to rely on round-trip signal timing. For example, before becoming airborne action may be taken to synchronize timing units of aircraft departing as a common flight in order to enable one-way timing.

Figure 3:
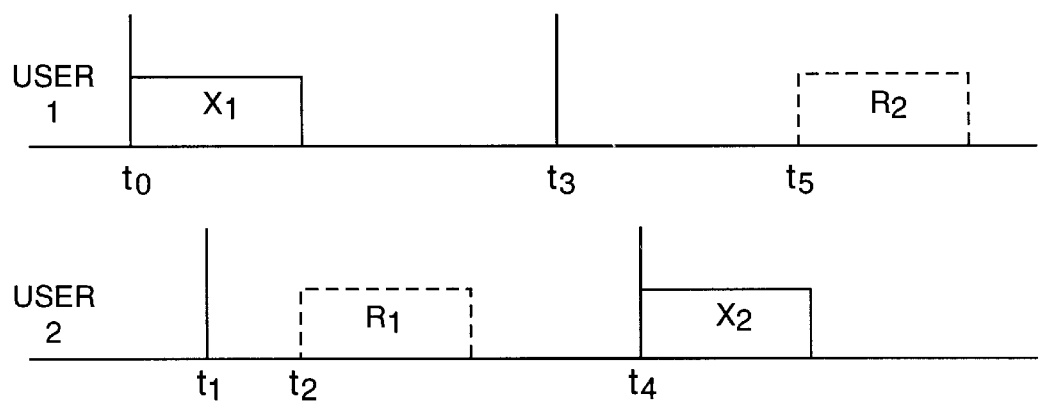
FIG. 3 illustrates timing relationships in transmission of CAS signals between a pair of aircraft of FIG. 2.

FIG. 3 illustrates aspects of inter-aircraft timing computations. If time-of-day and frequency of timing units 12 (also termed "clocks" herein) of the various aircraft participating in a local radio net are synchronized with sufficient accuracy, the arrival time and its rate of change can be mapped directly into aircraft separation and closing rate (e.g., via a look-up table provided for this purpose). Otherwise, round-trip ranging can be relied upon to determine separation and closing rate (e.g., by appropriate use of a look-up table). FIG. 3 illustrates transmission by User 1 of a signal segment, denoted as $X_1$, at a time $t_0$. For present discussion "User 1" and "User 2" can represent any two of the aircraft A, B, C, D of FIG. 2. Time $t_0$ must be known to the receiving aircraft (e.g., User 2) and this may be accomplished in a number of ways. If random access type transmissions are utilized, the transmitted CAS signals can include specification of time $t_0$. If assigned time slots are utilized (e.g., in a time division multiple access, or TDMA, type arrangement) then to can be pre-designated to be the start of one of the time slots uniquely assigned to User 1; a time which will be known to all other radio sub-net participants. Thus, with TDMA, User 1 does not have to communicate the value of $t_0$.

User 2 receives this signal segment, denoted at $R_1$, at time $t_2$. The actual propagation time is $t_2-t_0=S$ where S maps into the actual separation between User 1 and User 2. For purposes of example, assume User 2's clock is offset from User 1's clock by $\Delta$ seconds. Thus, what from the perspective of User 1 is $t_0$ is actually $t_1=t_0+\Delta$ seconds from User 2's perspective.

User 2's one way range measurement is then $T_{21}=t_2-t_1=S-t_1+t_0=S-\Delta$. If $\Delta$ is known to be tolerably small, then this one way ranging is sufficient. Because, on a steady state basis the sub-net users are assumed to have already synchronized with each other, $\Delta$ may in fact be tolerably small. This condition will exist when timing device 12 of each aircraft provides the same time-of-day value, within a predetermined tolerance. If $\Delta$ is known to be too large (for example, this will be true when first establishing the sub-net as well as when dealing with new entrants to the sub-net), then the system employs round trip ranging. This requires that User 2 communicate its one-way range measurement $T_{21}$ to User 1.

As shown in FIG. 3, for the second leg of the round-trip let User 2's next assigned time slot begin at $t_3$ according to User 1's clock and $t_4$ according to User 2's clock. User 2 then transmits its signal segment $X_2$ at $t_4$. Again, if random access techniques are used, this time's value must be communicated to the other users. Signal segment $X_2$ arrives as segment $R_2$ at User 1 at $t_5=t_4+S$. User 1 believes that the propagation time is $T_{12}=t_5-t_3=S+t_4-t3$. But, if the clock time offset has not changed from the time of User 1's slot to the time of User 2's slot, then $t_4-t_3=t_1-t_0=\Delta$. Thus $T_{12}=S+\Delta$. This constant offset is based on the premise that the clock frequency offset between the User's timing devices is negligible for the time between User 1's slot and User 2's slot.

User 1 then performs round trip ranging by computing $$S=0.5(T_{12}+T_{21})=0.5(S+\Delta+S-\Delta)=S$$

where, again, $T_{12}$ is User 1's own one-way measurement and $T_{21}$ is User 2's one-way measurement as communicated to User 1 by User 2, via the CAS signals.

For round trip ranging, in a presently preferred configuration each user must communicate its one-way measurement to all other sub-net members. This does not require that every transmission (time slot) must contain all one-way measurements. Rather, this information must be updated periodically in order to achieve desired accuracy. In this way, transmission of this information for all aircraft can occur over a number of individual transmissions. It should also be noted that the closing rate estimation accuracy will be affected by thefrequency offset between user clocks/ oscillators. If this offset is intolerably large, an analogous round trip computation can be made with the users communicating their one-way estimations of the closing rates to the other sub-net members, rather than relying on one-way ranging. Other system configurations may enable individual aircraft to make round-trip computations on their own. This mode of operation would typically require longer or additional time slots to accommodate such computations and the communication of the results thereof to other sub-net members.

Thus, the range and closing rate between two aircraft can be determined (or, more specifically, estimated with acceptable accuracy) by one-way or round-trip ranging. A currently preferred embodiment provides for both types of ranging according to operational circumstances. Previously described operational aspects are summarized in the FIG. 4 flow chart, which effectively represents one cycle of ranging activity between two aircraft, as part of action carried out repetitively between each aircraft and all other aircraft of a group of aircraft currently participating in a local radio sub-net established and maintained for CAS purposes.

Figure 4:
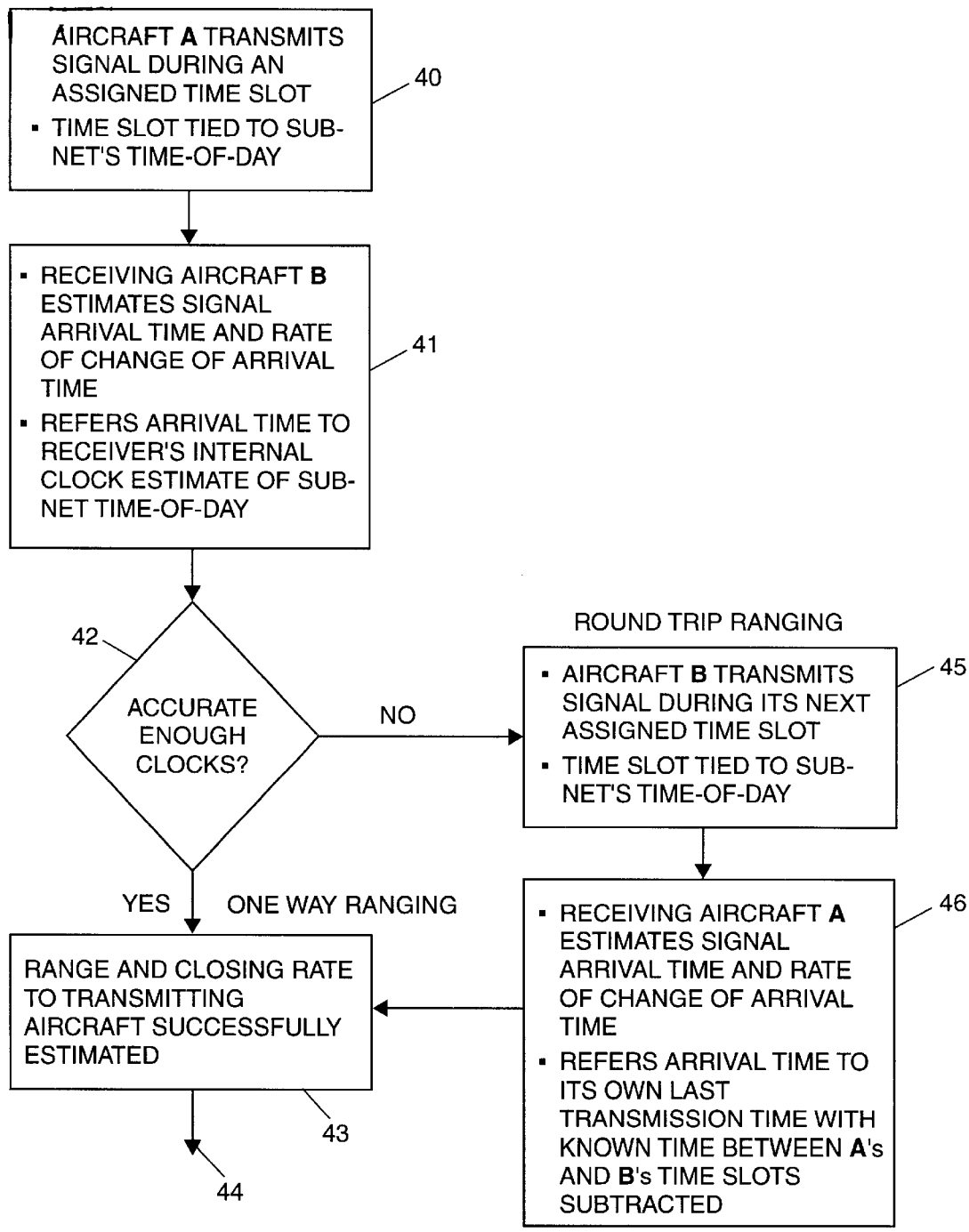
FIG. 4 is a flow chart illustrating alternative use of one-way and round-trip ranging between two aircraft.

At 40 in FIG. 4, aircraft A transmits a signal segment (e.g., as discussed with reference to FIG. 3) during one of its assigned time slots. The time slot is referenced to the sub-net's common time-of-day, so that all aircraft know the time at which the transmission by aircraft A is initiated.

At 41, the receiving aircraft B receives the signal segment and derives estimates of the signal arrival time and rate of change of arrival time relative to the signal arrival time of previous signal segments received from aircraft A. Arrival times are determined by reference to time-of-day values from the aircraft B clock. Based on arrival time data and known assigned transmit times of aircraft A, aircraft B derives signal transit time values.

At 42, a determination is made as to whether time-of-day values respectively provided by the aircraft A clock (for purposes of determining CAS signal transmission times) and the aircraft B clock (for purposes of determining CAS arrival times) are adequately synchronized to provide an acceptable error level. This may merely be a confirmation that appropriate synchronization of timing units was implemented prior to departure of a flight of several aircraft.

If the clocks are accurate enough, at 43 range and closing rate between aircraft A and B are derived (i.e., successfully estimated to an accuracy adequate for CAS purposes). In this case, it will be seen that one-way ranging is utilized. As indicated by arrow 44, the derived range and closing rate data are provided for further development of audio, visual or other forms of alerts, alarms, messages and evasive action indicators to be communicated to the flight crew of aircraft B. Relevant data as to range and closing rate are also desirably included in CAS signals sent to aircraft A and the other aircraft then participating in the local radio sub-net and can be used for confirmation of range and closing rate derivations/estimates by aircraft A and for 3-D geolocation of all aircraft of the group. While range and closing rates are typically referred to herein as being "derived", it will be appreciated that all range and closing rate value determinations will of necessity be estimates thereof in view the tolerances inherent in system performance.

If at 42 the clocks are determined to not be accurate enough, then at 45 CAS signals are responsively sent back to aircraft A by aircraft B. Thus, aircraft B transmits a responsive CAS signal in its next assigned time slot.

At 46, aircraft A, upon receiving the responsive transmission from aircraft B is enabled to perform round-trip ranging by reference to its own last transmission time and taking account of the known time differential between time slots of aircraft A and B and subtracting out such differential to derive estimates of signal arrival time and rate of change of arrival time, utilizing its internal clock. Based on such arrival time data, aircraft A derives signal transit time values.

Then, at 43 range and closing rate between aircraft A and B are derived on the basis of round-trip ranging. Derived range and closing rate data are provided (as indicated by arrow 44) for further use as described above, in order to provide flight crew communications. It will now be appreciated that, if desired, at 43 range and closing rate data as respectively determined by one-way ranging and round-trip ranging can be compared for purposes of confirmation or improved accuracy or reliability. Many variations on use of such data can be provided by skilled persons in view of the particulars and requirements of specific embodiments of CAS systems pursuant to the invention.

As described, the CAS system thus utilizes one-way ranging, round-trip ranging, or both types of ranging according to the operational circumstances which may exist from time to time. Round-trip ranging can be implemented without precise time-of-day synchronization between aircraft. However, one-way ranging, to provide acceptable accuracy, requires aircraft CAS systems to have accurate time-of-day synchronized timing devices or clocks. While a level of time synchronization is inherent in maintaining a local radio sub-net, such synchronization may not always be as stringent as required for one-way ranging accuracy.

A major advantage of one-way ranging is that, apart from the time offset error inherent in time synchronization tolerances, its range error variance is one-half that of round-trip ranging. In addition, with one-way ranging resistance to enemy interception/detection of CAS transmissions is better because only half as many transmissions may be employed, as compared to round-trip ranging. Particular advantages of preferred embodiments of the invention as described are that the system may be integrated with, and share system components such as antennas, RF sections, etc., with Interrogation Friend or Foe (IFF) systems or other systems in aircraft installations. Such arrangements also enable use of spread spectrum and other known techniques providing resistance to jamming, spoofing and unintentional interference, as well as to enemy detection and exploitation of CAS transmissions in combat or other operations.

For either kind of ranging, slant range and range rate accuracies and inherent inaccuracies derive from the receiving aircraft's capability to estimate/determine arrival time and rate of change of arrival time of the transmitting aircraft's signals. Such arrival time estimation inaccuracies depend on a number of factors, including the type of estimator design employed within processor 20, aircraft relative dynamics and the severity of various error contributors, such as noise, multipath and uncompensated delays in the transmitter and receiver processing. Using known technologies, estimator design for a presently preferred embodiment is based on a data-decision-aided second-order digital delay lock loop approach, with a relatively large effective noise bandwidth enabled by the relatively large received signal powers inherent in the low transmitted power/close proximity operating environment of a local sub-net. In deriving estimates of aircraft separation and closing rate on a continual basis, attention may be focused on variation in a signal parameter such as arrival time, carrier frequency, carrier phase, or combinations thereof using Doppler shift tracking or other techniques. Accordingly, a currently preferred approach is based on a discrete Kalman filter with the estimator provided in a closed loop configuration operating as a digital tracking loop. Employing known techniques in the light of particular operating conditions, skilled persons can implement such a tracking loop in the context of a digital delay locked loop (DLL), a digital frequency locked loop (FLL), or a digital phase locked loop (PLL) for estimation of delay, carrier frequency or carrier phase, respectively. Parameters thus derived can then be mapped to values of aircraft separation and closing rate and utilized for 3-D geolocation determinations as already discussed. It will now be appreciated that the basics of measurement of signal transit time between aircraft and rate of change thereof pursuant to the invention can be implemented with varying degrees of sophistication, from basic to the most complex, consistent with the invention.

Figure 5:
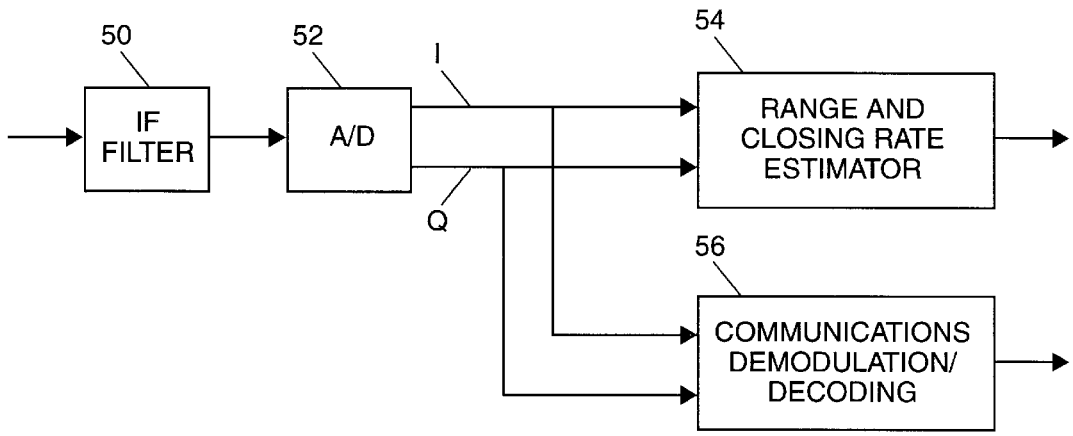
FIG. 5 is a block diagram illustrating basic elements of processor 20 of FIG. 1.

FIG. 5 is a block diagram referencing on an overview basis certain basic processor functions which may be implemented in processor 20 of FIG. 1. Following IF filter 50, analog to digital converter 52 provides I and Q outputs representative of received CAS signals. Operating on the I and Q signals, block 54 of the processor implements estimation of range and closing rate, while block 56 implements demodulation and decoding of data communications included in received CAS signals. Range and closing rate data is thus provided from estimator block 54 for further processing, look-up table referencing, development of pilot alerts, etc. Data from block 56 may include inter-aircraft range and closing rate data, as well as altimeter and GPS data, as developed and provided by other aircraft participating in the local radio sub-net. Such supplemental data from block 56 may be used for providing 3-D data representing three-dimensional location of all participating aircraft useful for evasive action analysis and other purposes. Particular elements of FIG. 5 may be provided as discrete units or implemented within processor 20, in order to provide data for further processing within processor 20 consistent with prior description above.

Figure 6:
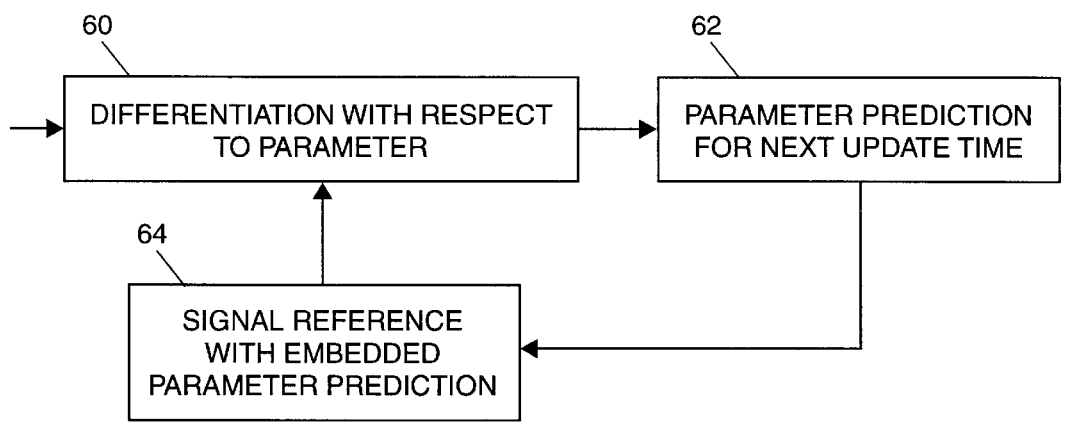
FIG. 6 is a block diagram illustrating basic closed loop estimator construction usable in estimator 54 of FIG. 5.

With reference to block 54 of FIG. 5, FIG. 6 is a block diagram illustrating basic elements of a closed loop estimator construction which may be utilized in estimator 54. Regardless of whether the signal parameter to be derived (i.e., estimated, as a practical matter) is arrival or transit time, carrier frequency or carrier phase, the design for continual estimation of the signal parameter of interest can be based on a discrete extended Kalman filter approach consistent with known design techniques. As illustrated on an overview basis, at 60 differentiation is carried out with respect to the selected parameter. At 62 the differentiation result is utilized to provide a prediction of the parameter value at the time of the next iteration of data reception. At 64 the parameter prediction value is incorporated into a signal reference for use in the next differentiation cycle. Thus, FIG. 6 operates as a digital loop filter which is actually a predictor of the parameter's value at the next update. This construction provides a digital tracking loop which can be utilized in the context of a digital delay locked loop (DLL) digital frequency locked loop (FLL) or digital phase locked loop (PLL) for purposes of deriving aircraft-to-aircraft range and closing rate based on parameter variations in signal delay, carrier frequency and carrier phase, respectively, consistent with established techniques.

The basic method of detecting a potential collision condition involves comparing the estimated separation and closing rate with appropriate "threshold" pairs for these parameters. As already discussed, several alert levels can be provided for, such as "watch", "warning" and "immediate evasive action required," corresponding to different respective "envelopes" of threshold pairs. When there is a sufficient number of sub-net participating aircraft (at least three if ancillary self-altitude measurements are available to all sub-net members via inter-aircraft CAS communications and at least four if such measurements aren't) these range and closing rate values also enable each aircraft (via multilateration techniques) to estimate the relative three-dimensional positions and velocities of the other aircraft as an aid in determining the best collision avoidance maneuver in particular circumstances. The inter-aircraft CAS signals provide additional data capacity and may also carry data containing information usable to supplement or aid in ranging computations, as well as any other information the sending aircraft has (e.g., from other on-board sub-systems or from other communications) that can significantly aid or improve CAS performance. Examples of such other information include altimeter readings, GPS-derived position and velocity information, and inertial sub-system heading information.

In application of the invention, it has been determined that inter-aircraft range and closing rate can be determined with accuracies of the order of 10 feet±2 feet and 2 feet/second±0.2 feet/second. These accuracies are of the order of one-quarter of the tolerances achievable by prior employment of GPS or radar based CAS approaches. Typically, a local radio sub-net for CAS purposes consistent with the invention may be designed for active participation by up to ten aircraft currently in a common locational neighborhood (e.g., all within a fifty mile range of each other). In this context, transmitted power levels may be limited to less than one watt average power.

While there have been described the currently preferred embodiments of the invention, those skilled in the art will recognize that other and further modifications may be made without departing from the invention and it is intended to claim all modifications and variations as fall within the scope of the invention.

What is claimed is:

1. A collision avoidance system (CAS), suitable for airborne use on a first aircraft to enable collision avoidance during close proximity operation of a group of CAS equipped aircraft, comprising:
   a timing device to provide time data;
   a transmitter to transmit CAS signals at defined send times and in format usable during said close proximity operation to derive signal transit time values;
   a receiver to receive CAS signals in said format from other aircraft of the group; and
   a processor coupled to the timing device, transmitter and receiver and responsive to received CAS signals to:
      (i) derive received signal parameter values, including transit time values representative of differences between send times and receive times of CAS signals received from other aircraft of the group; and
      (ii) utilize said signal parameter values to repetitively derive data on range and closing rate between the first aircraft and at least one other aircraft of said group during said close proximity operation.

2. A collision avoidance system as in claim 1, wherein the processor is further arranged to:
   (iii) utilize a local radio sub-net time-of-day reference to control send times of CAS signals transmitted by the transmitter.

3. A collision avoidance system as in claim 1, additionally comprising a memory arranged to store a look-up table usable to reference range and closing rate data to collision danger conditions, and wherein the processor is further arranged to:
   (iii) access the look-up table to utilize said data on range and closing rate to derive signals representative of a condition of danger of impending collision between aircraft during said close proximity operation.

4. A collision avoidance system as in claim 1, wherein the processor is arranged to derive said signal transit time values based on one-way signal transit time for CAS signals sent to the first aircraft from a second aircraft of the group.

5. A collision avoidance system as in claim 1, wherein the processor is arranged to derive said signal transit time values based on round-trip signal transit time for CAS signals sent from the first aircraft to a second aircraft of the group and responsively sent back to the first aircraft from said second aircraft.

6. A collision avoidance system as in claim 5, wherein said signal transit time values are based on one-half of the round-trip signal transit time, after adjustment to subtract turnaround time between signal reception and responsive transmission of CAS signals by the second aircraft.

7. A collision avoidance system as in claim 1, wherein the processor is arranged to derive said signal transit time values based selectively on one of: one-way signal transit time for CAS signals sent to the first aircraft from a second aircraft of the group and; round-trip transit time for CAS signals sent from the first aircraft to said second aircraft and responsively sent back to the first aircraft from the second aircraft.

8. A collision avoidance system as in claim 1, wherein the processor is arranged to derive said data on range and closing rate independently of use of GPS data regarding aircraft location.

9. A collision avoidance system as in claim 1, wherein the processor is further arranged to:
(iii) utilize said data on range and closing rate to repetitively derive 3-D data representative of the three-dimensional relative location of all aircraft of the group.

10. A collision avoidance system as in claim 9, wherein the processor, in deriving said 3-D data, is also responsive to at least one of: altimeter data for the first aircraft, and altimeter data for other aircraft of the group as included in received CAS signals; and GPS data for the first aircraft, and GPS data for other aircraft of the group as included in received CAS signals.

11. A collision avoidance system as in claim 1, wherein the processor is further arranged to:
(iii) establish and maintain a local radio sub-net with other aircraft of the group and thereby synchronize operation of said timing device with timing devices of such other aircraft to provide common time-of-day time data for use in deriving said signal transit time values.

12. A collision avoidance system as in claim 1, wherein the processor is also responsive to data on range and closing rate between other pairs of aircraft of said group, as included in received CAS signals.

13. A collision avoidance system as in claim 1, wherein the processor is further arranged to:
(iii) derive signals representative of evasive action to be taken to remove the first aircraft from a condition of danger of impending collision between aircraft.

14. A collision avoidance system as in claim 1, wherein the processor is arranged to repetitively derive said data on closing rate based on analysis of received signal parameter values relating to one of: received signal carrier frequency variations; and received signal carrier phase variations.

15. A method, to operate a collision avoidance system (CAS) within a group of aircraft, comprising the steps of:
(a) establishing a local radio sub-net between aircraft of a group of aircraft within a limited volume of airspace;
(b) transmitting aircraft-to-aircraft CAS signals of format usable to derive time reference values;
(c) receiving said CAS signals and deriving data on inter-aircraft range and closing rate based on received signal parameter values, including signal transit time between aircraft; and
(d) accessing a look-up table usable to reference range and closing rate data to collision danger conditions to utilize data derived in step (c) to derive signals representative of a condition of danger of impending collision between aircraft.

16. A method as in claim 15, wherein in step (b) said CAS signals include data on inter-aircraft range and closing rate between pairs of aircraft of said group as previously derived in CAS operation.

17. A method as in claim 15, wherein step (b) includes transmitting said CAS signals in a low power spread spectrum format to reduce the probability of undesired interception or detection of such signals.

18. A method as in claim 15, wherein step (c) includes deriving data representative of the three-dimensional location of all aircraft of the group.

19. A method as in claim 18, wherein step (d) additionally includes deriving signals usable to indicate evasive action to be taken to alleviate a danger of impending collision between aircraft.

20. A method as in claim 15, which excludes use of GPS data in deriving said data on inter-aircraft range and closing rate.

21. A method as in claim 15, wherein step (c) includes deriving data on closing rate based on analysis of received signal parameter values relating to received signal carrier frequency variations.

22. A method as in claim 15, wherein step (c) includes deriving data on closing rate based on analysis of received signal parameter values relating to received signal carrier phase variations.

23. A collision avoidance system (CAS), suitable for airborne use on a first aircraft to enable collision avoidance during operation of a group of CAS equipped aircraft, comprising:
a timing device to provide time data;
a transmitter to transmit CAS signals at defined send times and in format usable to derive signal transit time values;
a receiver to receive CAS signals in said format from other aircraft of the group;
a memory to store a look-up table usable to reference range and closing rate data to collision danger conditions; and
a processor coupled to the timing device, transmitter, receiver and memory and responsive to received CAS signals to:
(i) derive received signal parameter values, including transit time values representative of differences between send times and receive times of CAS signals received from other aircraft of the group;
(ii) utilize said signal parameter values to repetitively derive data on range and closing rate between the first aircraft and at least one other aircraft of said group; and
(iii) access the look-up table to utilize said data on range and closing rate to derive signals representative of a condition of danger of impending collision between aircraft.

24. A collision avoidance system as in claim 23, wherein the processor is further arranged to:
(iv) derive signals representative of evasive action to be taken to remove the first aircraft from a condition of danger of impending collision between aircraft.

25. A collision avoidance system as in claim 23, wherein the processor is arranged to repetitively derive said data on closing rate based on analysis of received signal parameter values relating to received signal carrier frequency variations.

26. A collision avoidance system as in claim 23, wherein the processor is arranged to repetitively derive said data on closing rate based on analysis of received signal parameter values relating to received signal carrier phase variations.

27. A collision avoidance system as in claim 23, wherein the processor is arranged to derive said signal transit time values based on round-trip signal transit time for CAS signals sent from the first aircraft to a second aircraft of the group and responsively sent back to the first aircraft from said second aircraft.

28. A collision avoidance system as in claim 27, wherein said signal transit time values are based on one-half of the round-trip signal transit time, after adjustment to subtract turnaround time between signal reception and responsive transmission of CAS signals by the second aircraft.

29. A collision avoidance system as in claim 23, wherein the processor is arranged to derive said signal transmit time values based selectively on one of: one-way signal transit time for CAS signals sent to the first aircraft from a second aircraft of the group and; round-trip transit time for CAS signals sent from the first aircraft to said second aircraft and responsively sent back to the first aircraft from the second aircraft.

* * * * *